(12) United States Patent
Schimke et al.

(10) Patent No.: US 10,906,396 B1
(45) Date of Patent: Feb. 2, 2021

(54) TRANSFER CASE NEUTRAL OVERRIDE AND REMOTE PUMP MOUNTING

(71) Applicant: Oshkosh Defense, LLC, Oshkosh, WI (US)

(72) Inventors: Martin Schimke, Oshkosh, WI (US); Eric Braun, Neenah, WI (US); Jeremy Kiekhaefer, Oshkosh, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 408 days.

(21) Appl. No.: 15/957,497

(22) Filed: Apr. 19, 2018

Related U.S. Application Data

(60) Provisional application No. 62/487,689, filed on Apr. 20, 2017.

(51) Int. Cl.
    *B60K 23/08*     (2006.01)
    *B60K 17/344*    (2006.01)
    *F16H 63/28*     (2006.01)
    *B60K 17/28*     (2006.01)

(52) U.S. Cl.
    CPC ............. *B60K 23/08* (2013.01); *B60K 17/28* (2013.01); *B60K 17/344* (2013.01); *F16H 63/28* (2013.01); *B60K 2023/0891* (2013.01)

(58) Field of Classification Search
    CPC ...... B60K 23/08; B60K 17/344; B60K 17/28; B60K 2023/0891; F16H 63/28
    See application file for complete search history.

(56) References Cited

U.S. PATENT DOCUMENTS

| | | | |
|---|---|---|---|
| 2,601,297 A * | 6/1952 | Keese | F16H 3/091 74/359 |
| 3,316,571 A * | 5/1967 | Cutrone | B23G 1/22 408/9 |
| 4,441,379 A * | 4/1984 | Malkowski | B60K 17/344 74/473.21 |
| 5,498,208 A | 3/1996 | Braun | |
| 5,501,567 A | 3/1996 | Lanzdorf et al. | |
| 5,607,028 A | 3/1997 | Braun et al. | |
| 5,820,150 A | 10/1998 | Archer et al. | |
| 5,820,258 A | 10/1998 | Braun | |
| 5,867,092 A * | 2/1999 | Vogt | F16H 59/70 200/61.91 |
| 6,086,074 A | 7/2000 | Braun | |
| 7,073,620 B2 | 7/2006 | Braun et al. | |

(Continued)

*Primary Examiner* — Victor L MacArthur
(74) *Attorney, Agent, or Firm* — Foley & Lardner LLP

(57) ABSTRACT

A vehicle includes a transmission, a transfer case configured to directly couple to the transmission, and an override system coupled to the transfer case. The transfer case includes a shift rod, a piston assembly including a first piston coupled to the shift rod and a second piston selectively engageable with the first piston, and a resilient member positioned to bias the shift rod and the first piston into a high position corresponding with a high mode of operation of the transfer case. The override system includes a housing coupled to the transfer case, a lever coupled to the housing and pivotally actuatable between a first position and a second position, and an engagement element disposed within the housing and coupled to the lever. The engagement element is configured to engage the second piston in response to the lever being pivoted from the first position to the second position.

15 Claims, 17 Drawing Sheets

(56) References Cited

U.S. PATENT DOCUMENTS

| | | |
|---|---|---|
| 7,198,130 B2 | 4/2007 | Schimke |
| 7,258,194 B2 | 8/2007 | Braun et al. |
| 7,357,203 B2 | 4/2008 | Morrow et al. |
| 7,448,460 B2 | 11/2008 | Morrow et al. |
| 7,824,293 B2 | 11/2010 | Schimke |
| 7,931,103 B2 | 4/2011 | Morrow et al. |
| 8,123,645 B2 | 2/2012 | Schimke |
| 8,337,352 B2 | 12/2012 | Morrow et al. |
| 8,561,735 B2 | 10/2013 | Morrow et al. |
| 8,801,318 B2 | 8/2014 | Knoble et al. |
| 8,864,613 B2 | 10/2014 | Morrow et al. |
| 9,174,686 B1 | 11/2015 | Messina et al. |
| 9,428,042 B2 | 8/2016 | Morrow et al. |
| 9,641,120 B2 | 5/2017 | Matsuda et al. |
| 9,707,869 B1 | 7/2017 | Messina et al. |
| 9,970,515 B2 | 5/2018 | Morrow et al. |
| 10,029,556 B2 | 7/2018 | Morrow et al. |

\* cited by examiner

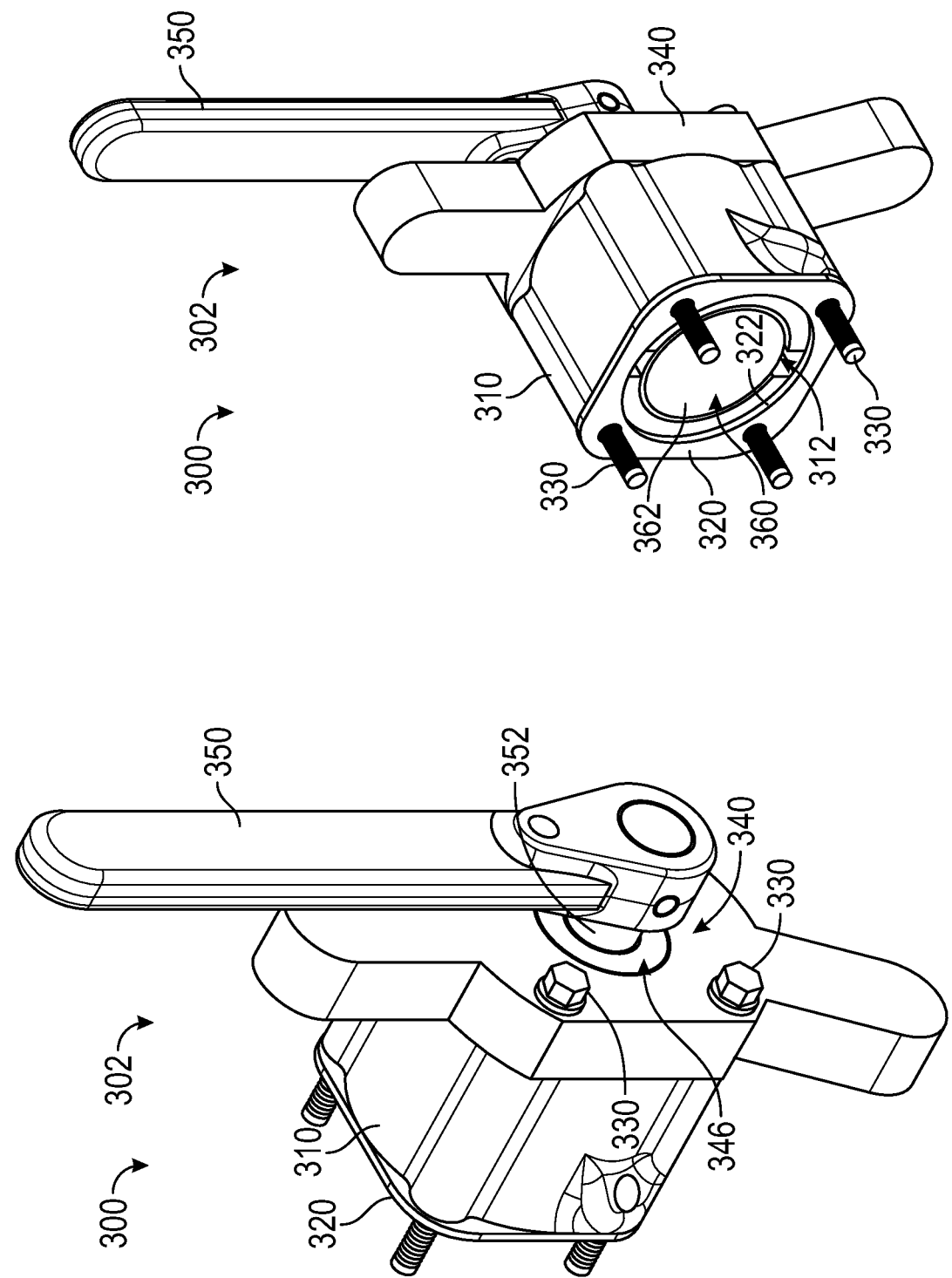

TRANSFER CASE NEUTRAL OVERRIDE AND REMOTE PUMP MOUNTING

CROSS-REFERENCE TO RELATED PATENT APPLICATIONS

This application claims the benefit of U.S. Provisional Application No. 62/487,689, filed Apr. 20, 2017, which is incorporated herein by reference in its entirety.

BACKGROUND

Transfer cases for vehicle powertrain systems enable operating the vehicle powertrain in a high mode, a low mode, and a neutral mode. Transfer cases may traditionally include a linearly actuated override system configured to facilitate manually reconfiguring the transfer case into the neutral mode (e.g., to facilitate towing the vehicle, etc.).

SUMMARY

One exemplary embodiment relates to a vehicle. The vehicle includes a transmission, a transfer case coupled to the transmission, and an override system coupled to the transfer case. The transfer case includes a shift rod, a piston assembly including a first piston coupled to the shift rod and a second piston selectively engageable with the first piston, and a resilient member positioned to bias the shift rod and the first piston into a high position corresponding with a high mode of operation of the transfer case. The override system includes a housing coupled to the transfer case, a lever coupled to the housing and pivotally actuatable between a first position and a second position, and an engagement element disposed within the housing and coupled to the lever. The engagement element is configured to engage the second piston in response to the lever being pivoted from the first position to the second position such that the second piston engages the first piston, thereby repositioning the first piston and the shift rod to a neutral position corresponding with a neutral mode of operation of the transfer case.

Another exemplary embodiment relates to an override system for a transfer case of a powertrain of a vehicle. The override system includes a housing, an actuator, and an engagement element. The housing defines a cavity, a first aperture, and a second aperture. The housing is configured to couple to the transfer case such that the first aperture aligns with a piston cavity of the transfer case. The actuator includes a lever and a pivot rod coupled to a proximal end of the lever. The lever is selectively pivotable between a first position and a second position. The pivot rod extends from the lever through the second aperture into the cavity. The engagement element is disposed within the cavity and coupled to the pivot rod. The engagement element receives a rotational input from the pivot rod and provides at least one of (i) a rotational output and (ii) a translational output in response to the lever being pivoted to the second position. A portion of the engagement element extends through the first aperture into the piston cavity and engages a piston assembly disposed therein in response to the lever being pivoted to the second position to reconfigure the transfer case from a first configuration to a second configuration.

Still another exemplary embodiment relates to a transfer case assembly for a vehicle. The transfer case assembly includes a transfer case configured to directly couple to a transmission of the vehicle and an override system coupled to the transfer case. The transfer case includes a transfer case housing defining a first cavity and a second cavity, a gear assembly disposed within the first cavity, a piston assembly disposed within the second cavity, a rod having an end coupled to the piston assembly and extending between the first cavity and the second cavity, and a fork coupled to the rod and the gear assembly. The override system includes a body coupled to the transfer case housing and positioned to align with the second cavity, an actuator coupled to the housing and actuatable between a first position and a second position, and an engagement element disposed within the body and coupled to the actuator. The engagement element is configured to extend into the second cavity and engage the piston assembly in response to the actuator being actuated from the first position to the second position to reposition the rod, the fork, and the gear assembly to a neutral position corresponding with a neutral mode of operation of the transfer case.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which:

FIGS. 16-18 are various views of a second neutral override system for the transfer case of FIGS. 2-5 arranged in a first configuration, according to an exemplary embodiment;

DETAILED DESCRIPTION

Before turning to the figures, which illustrate the exemplary embodiments in detail, it should be understood that the present application is not limited to the details or methodology set forth in the description or illustrated in the figures.

It should also be understood that the terminology is for the purpose of description only and should not be regarded as limiting.

According to an exemplary embodiment, a vehicle includes various components that improve performance relative to traditional systems. The vehicle includes a transmission, a transfer case coupled to the transmission, and a manual override system coupled to the transfer case. In other embodiments, the transfer case is not coupled (e.g., not directly coupled, etc.) to the transmission. By way of example, the manual override system may be provided as part of a divorced transfer case. In still other embodiments, the manual override system includes one or more components that are not coupled to the transfer case. The manual override system is configured to facilitate manually reconfiguring the transfer case from a high and/or low mode of operation to a neutral mode of operation. In one embodiment, the manual override system is provided as part of a two speed transfer case. In another embodiment, the manual override system is provided as part of a single speed transfer case. According to an exemplary embodiment, the manual override system includes a pivotal lever and engagement element. Pivotal actuation of the pivotal lever causes the engagement element to engage with a piston system. Such engagement causes the piston system to linearly translate which reconfigures the transfer case from the high and/or low mode of operation into the neutral mode of operation. According to an exemplary embodiment, the pivotal actuation of the lever provides various advantageous over traditional, translational push-pull systems. By way of example, rotary actuation may require less force than linear actuation. By way of another example, rotary actuation may prevent dirt and/or debris from being pulled into the transfer case like traditional, translation push-pull systems. By way of yet another example, rotary actuation may facilitate manufacturing an override system that is more compact than linearly actuated systems.

Figure 1:
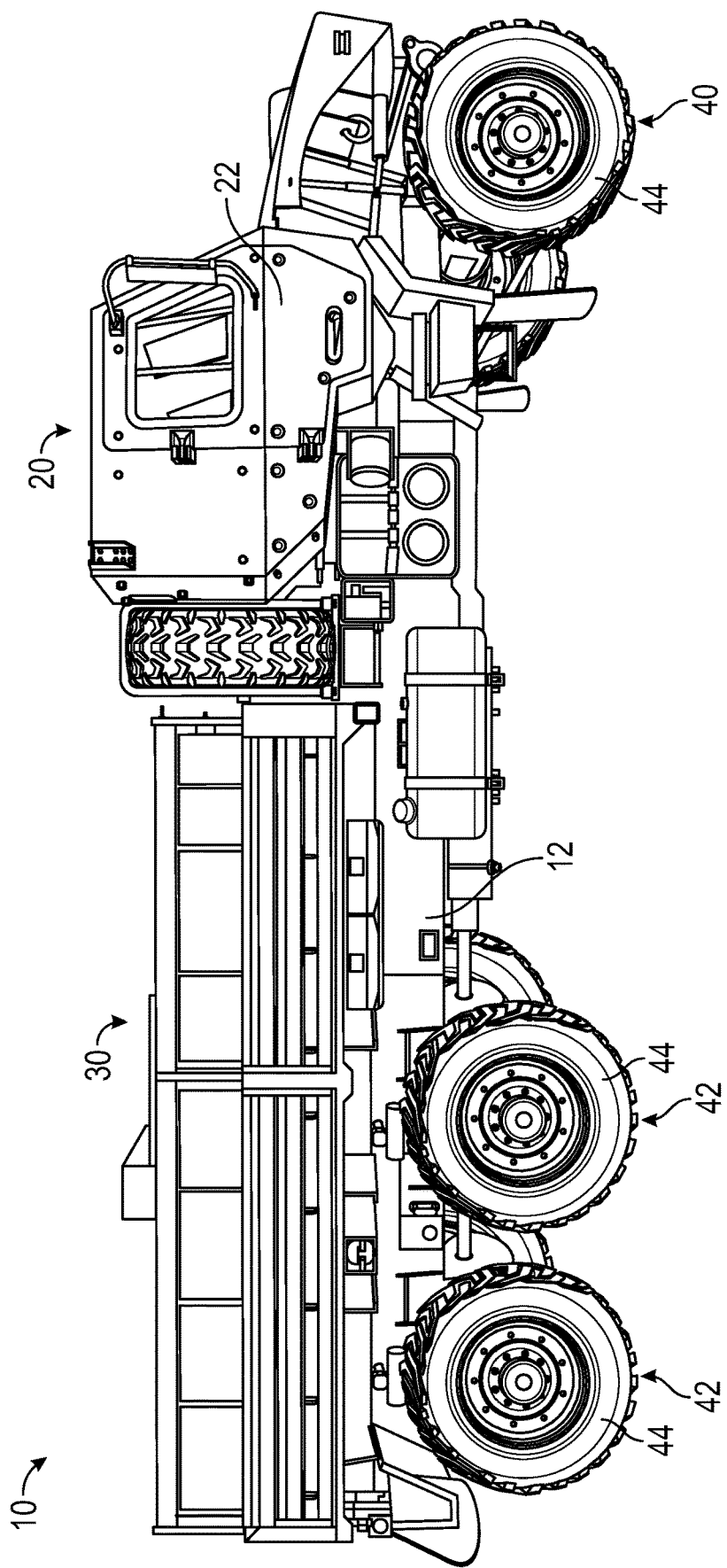
FIG. 1 is a side view of a vehicle, according to an exemplary embodiment.
Figure 2:
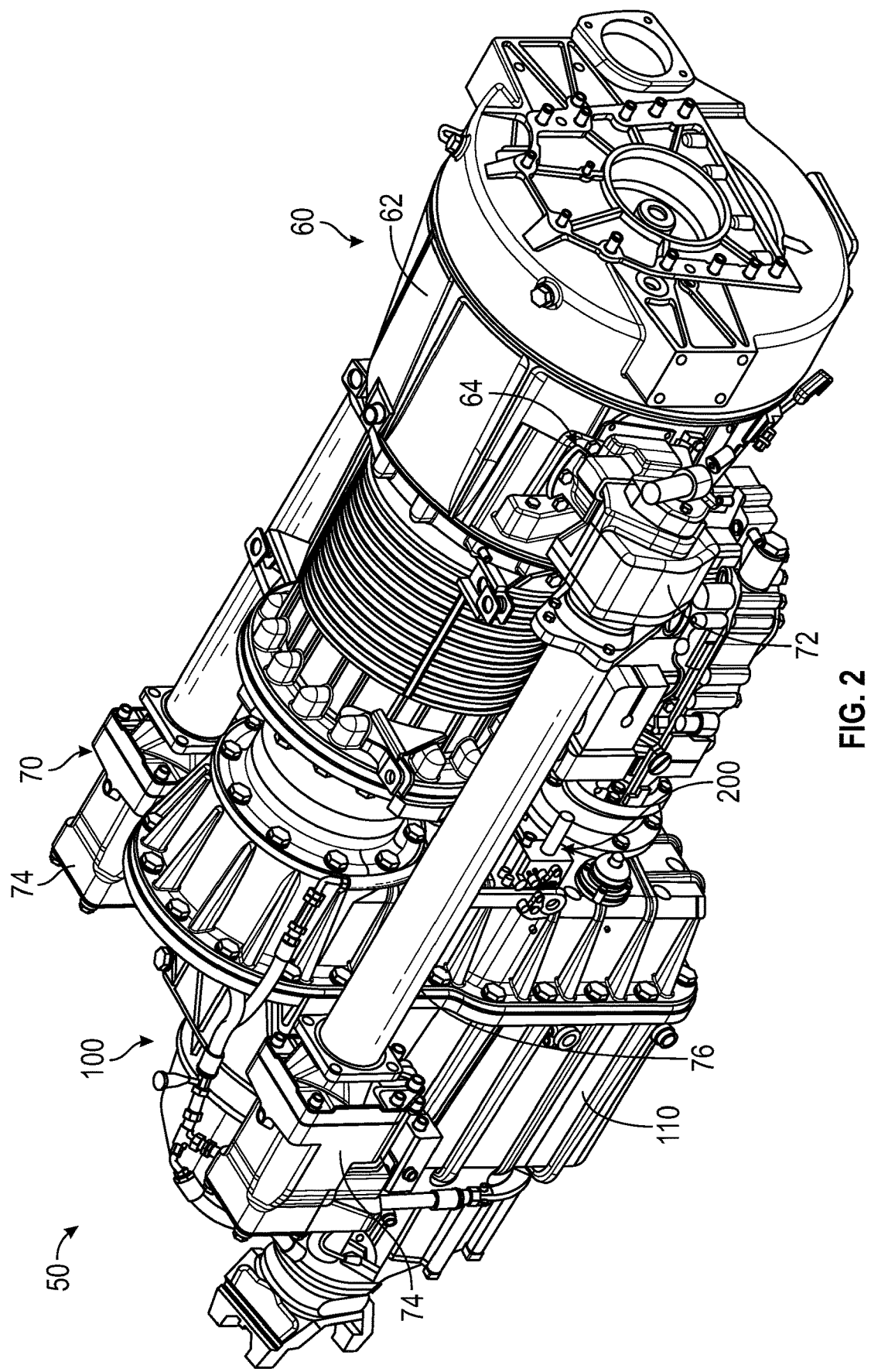
FIGS. 2-5 are various perspective views of a transmission and a transfer case of a powertrain of the vehicle of FIG. 1, according to an exemplary embodiment.
Figure 3:
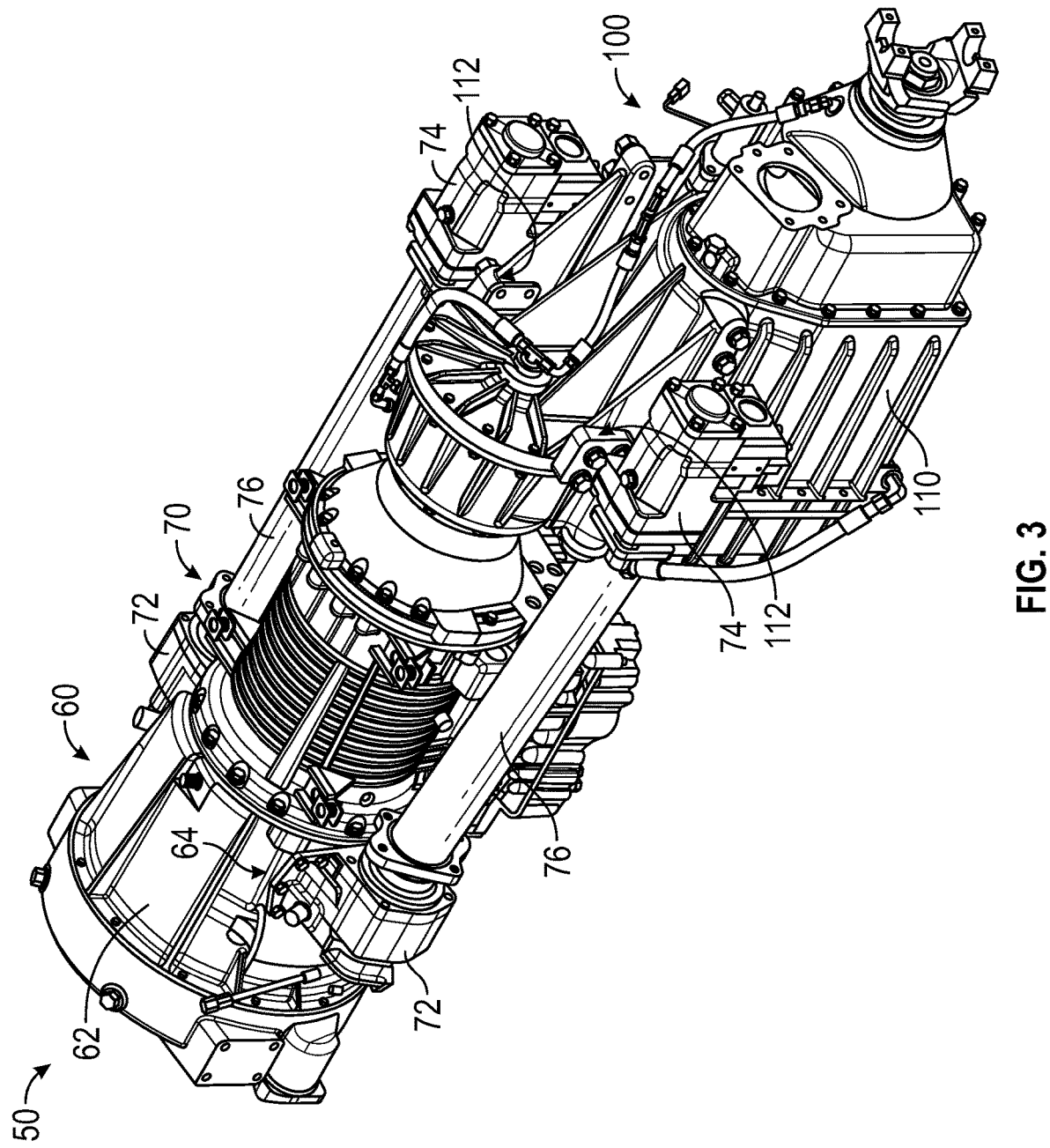
Figure 4:
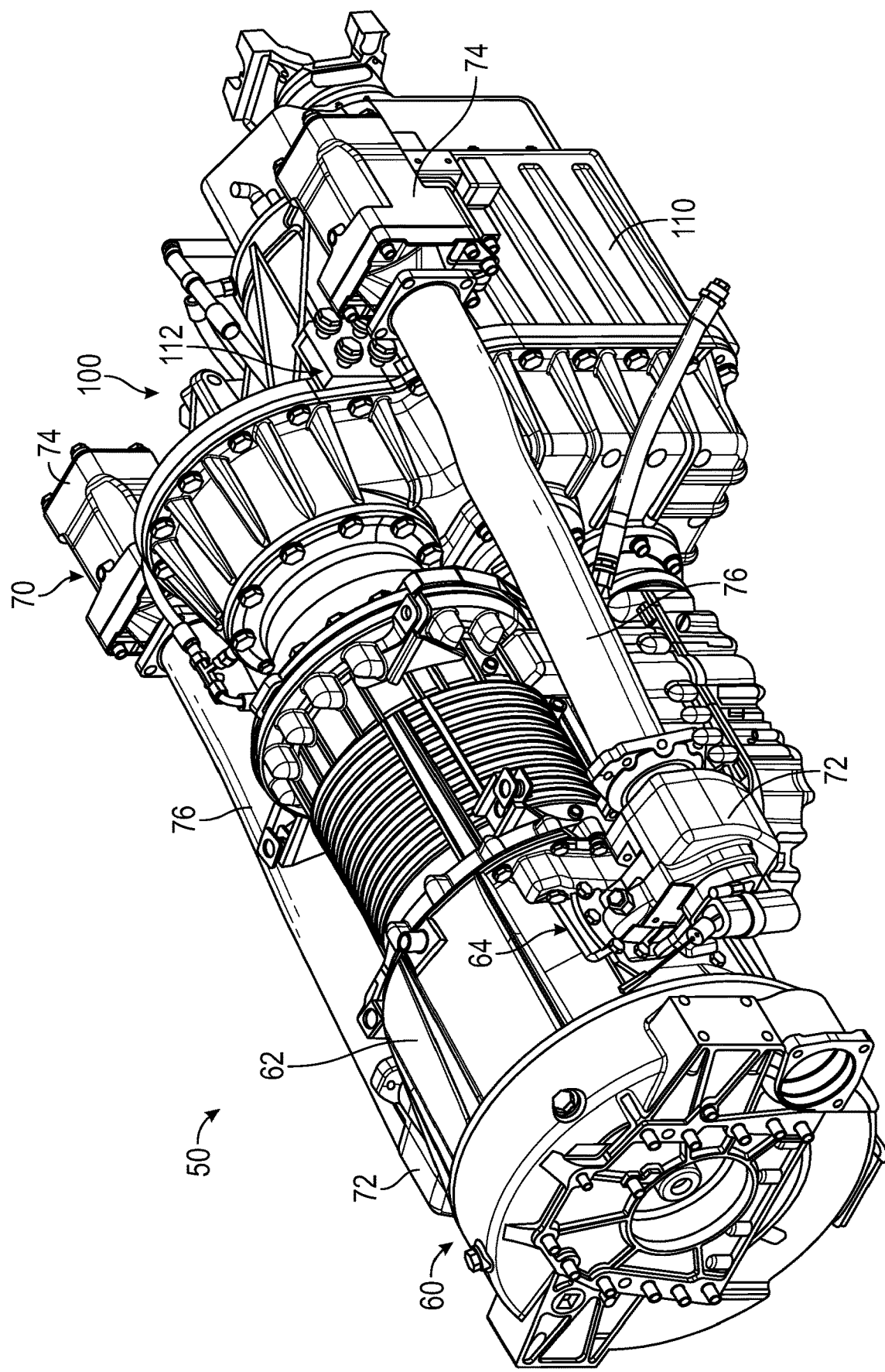
Figure 5:
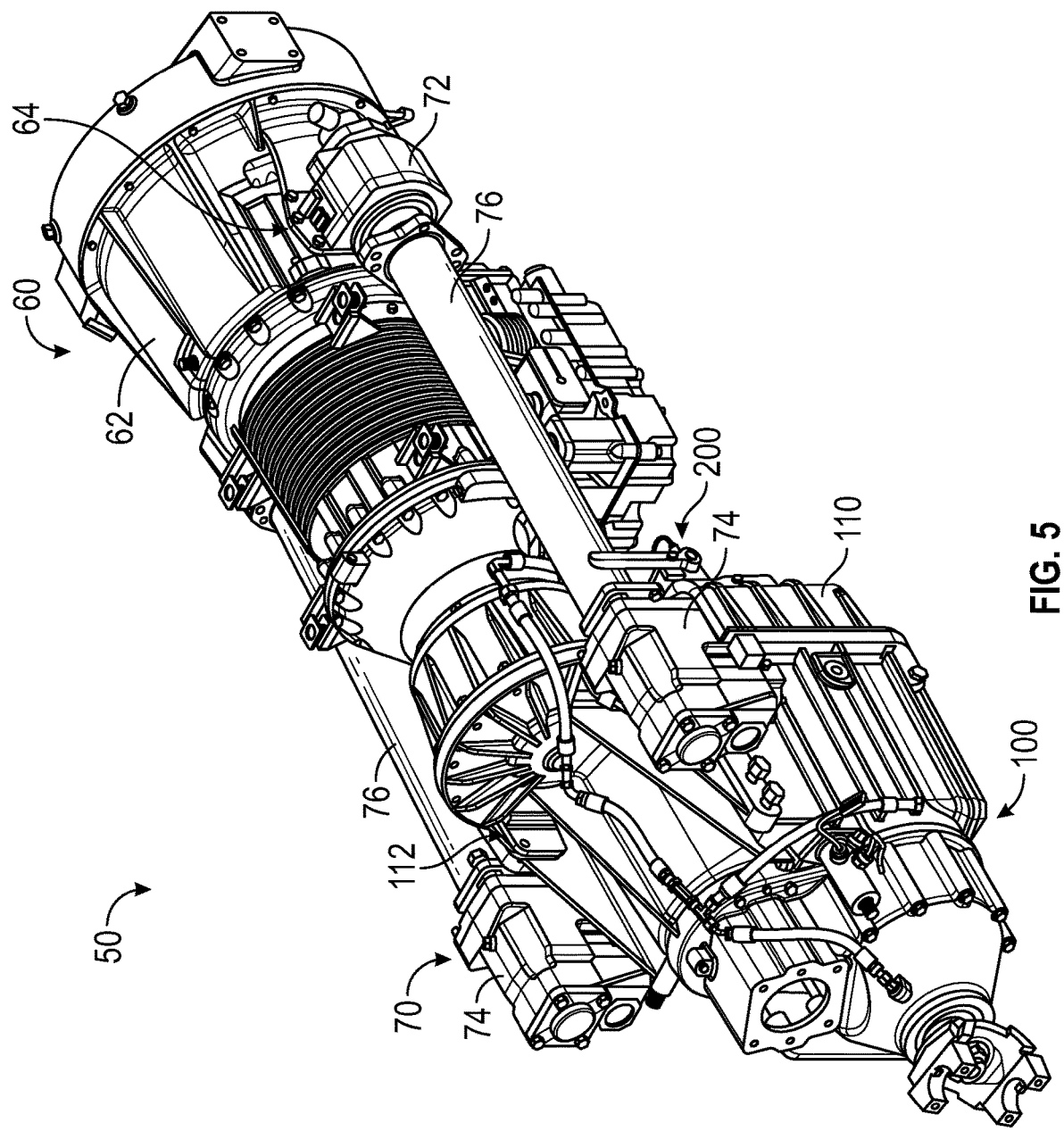

According to the exemplary embodiment shown in FIG. 1, a vehicle, shown as vehicle 10, includes a chassis, shown as frame 12, that supports a body assembly including a first portion, shown as front cabin 20, and a second portion, shown as mission equipment 30. As shown in FIG. 1, the mission equipment 30 is disposed behind the front cabin 20. The frame 12 of the vehicle 10 engages a plurality of tractive assemblies, shown as front tractive assemblies 40 and rear tractive assemblies 42. According to an exemplary embodiment, the vehicle 10 is a military ground vehicle. In other embodiments, the vehicle 10 is an off-road vehicle such as a utility task vehicle, a recreational off-highway vehicle, an all-terrain vehicle, a sport utility vehicle, and/or still another vehicle. In yet other embodiments, the vehicle 10 is another type of off-road vehicle such as mining, construction, and/or farming equipment. In still other embodiments, the vehicle 10 is an aerial truck, a rescue truck, an aircraft rescue and firefighting (ARFF) truck, a concrete mixer truck, a refuse truck, a commercial truck, a tanker, an ambulance, and/or still another vehicle.

According to an exemplary embodiment, the frame 12 defines a longitudinal axis. The longitudinal axis may be generally aligned with a frame rail of the frame 12 of the vehicle 10 (e.g., front-to-back, etc.). In some embodiments, the vehicle 10 includes a plurality of front tractive assemblies 40 and/or a plurality of rear tractive assemblies 42 (e.g., one, two, etc.). The front tractive assemblies 40 and/or the rear tractive assemblies 42 may include brakes (e.g., disc brakes, drum brakes, air brakes, etc.), gear reductions, steering components, wheel hubs, wheels, tires, and/or other features. As shown in FIG. 1, the front tractive assemblies 40 and the rear tractive assemblies 42 each include tractive elements, shown as wheel and tire assemblies 44. In other embodiments, at least one of the front tractive assemblies 40 and the rear tractive assemblies 42 include a different type of tractive element (e.g., a track, etc.).

According to an exemplary embodiment, the front cabin 20 includes one or more doors, shown as doors 22, that facilitate entering and exiting an interior of the front cabin 20. The interior of the front cabin 20 may include a plurality of seats (e.g., two, three, four, five, etc.), vehicle controls, driving components (e.g., steering wheel, accelerator pedal, brake pedal, etc.), etc. According to the exemplary embodiment shown in FIG. 1, the mission equipment 30 includes a cargo body configured to facilitate transporting various military equipment (e.g., medical supplies, ammunition, weapons, missiles, personnel, etc.). In other embodiments, the mission equipment 30 includes a truck bed or a flat bed. In some embodiments, the mission equipment 30 additionally or alternatively includes a boom lift. In another embodiment, the mission equipment 30 includes an at least partially enclosed troop transport cabin configured to facilitate transporting troops (e.g., eight, ten, twelve, twenty, etc.) with the vehicle 10.

According to an exemplary embodiment, the vehicle 10 includes a powertrain system. The powertrain system may include a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may receive fuel (e.g., gasoline, diesel, etc.) from a fuel tank and combust the fuel to generate mechanical energy. A transmission may receive the mechanical energy and provide an output to the generator. The generator may be configured to convert mechanical energy into electrical energy that may be stored by the energy storage device. The energy storage device may provide electrical energy to a motive driver to drive at least one of the front tractive assemblies 40 and the rear tractive assemblies 42. In some embodiments, each of the front tractive assemblies 40 and/or the rear tractive assemblies 42 include an individual motive driver (e.g., a motor that is electrically coupled to the energy storage device, etc.) configured to facilitate independently driving each of the wheel and tire assemblies 44. In some embodiments, a transmission of the vehicle 10 is rotationally coupled to the primary driver, a transfer case assembly, and one or more drive shafts. The one or more drive shafts may be received by one or more differentials configured to convey the rotational energy of the drive shaft to a final drive (e.g., half-shafts coupled to the wheel and tire assemblies 44, etc.). The final drive may then propel or moves the vehicle 10. In such embodiments, the vehicle 10 may not include the generator and/or the energy storage device. The powertrain of the vehicle 10 may thereby be a hybrid powertrain or a non-hybrid powertrain. According to an exemplary embodiment, the primary driver is a compression-ignition internal combustion engine that utilizes diesel fuel. In alternative embodiments, the primary driver is another type of device (e.g., spark-ignition engine, fuel cell, electric motor, etc.) that is otherwise powered (e.g., with gasoline, compressed natural gas, hydrogen, electricity, etc.).

According to the exemplary embodiment shown in FIGS. 2-23, a portion of a powertrain, shown as powertrain 50, of the vehicle 10 includes a transmission, shown as transmission 60, at least one remote mount power take-off ("PTO") system, shown as PTO assemblies 70, and a transfer case, shown as transfer case 100, including at least one of a first neutral override system, shown as cam override system 200, and a second neutral override system, shown as helical override system 300, coupled thereto.

As shown in FIGS. 2-5, the powertrain 50 includes two PTO assemblies 70. In other embodiments, the powertrain 50 includes one PTO assembly 70. In still other embodiments, the powertrain 50 includes more than two PTO assemblies 70 (e.g., three, four, etc.). As shown in FIGS. 2-5, each PTO assembly 70 includes a PTO, shown as PTO 72, a PTO driven device, shown as pump 74, and a shaft, shown as PTO shaft 76, extending between the PTO 72 and the pump 74 thereof. As shown in FIGS. 2-5, the transmission 60 includes a housing, shown as transmission housing 62. The transmission housing 62 defines at least one mounting location (e.g., one, two, three, etc.), shown as PTO mounts 64. The PTO mounts 64 are configured (e.g., structured, shaped, positioned, etc.) to facilitate coupling the PTOs 72 to the transmission housing 62. As shown in FIGS. 2-5, the transfer case 100 includes a housing, shown as transfer case housing 110. The transfer case housing 110 defines at least one mounting location (e.g., one, two, three, etc.), shown as pump mounts 112. The pump mounts 112 are configured (e.g., structured, shaped, positioned, etc.) to facilitate coupling the pumps 74 to the transfer case housing 110 and positioned to align the pumps 74 with the PTOs 72. According to an exemplary embodiment, the transmission 60 is configured to directly drive each of the PTOs 72 such that rotational mechanical energy is provided by each PTO 72 to a respective PTO shaft 76. The PTO shafts 76 may then provide the rotational mechanical energy to the pumps 74. The pumps 74 may be or include hydraulic pumps, pneumatic pumps, water pumps, coolant pumps, and/or any other device that may be driven by a PTO used to power various systems of the vehicle 10 (e.g., engine accessories, vehicle accessories, etc.).

Figure 12:
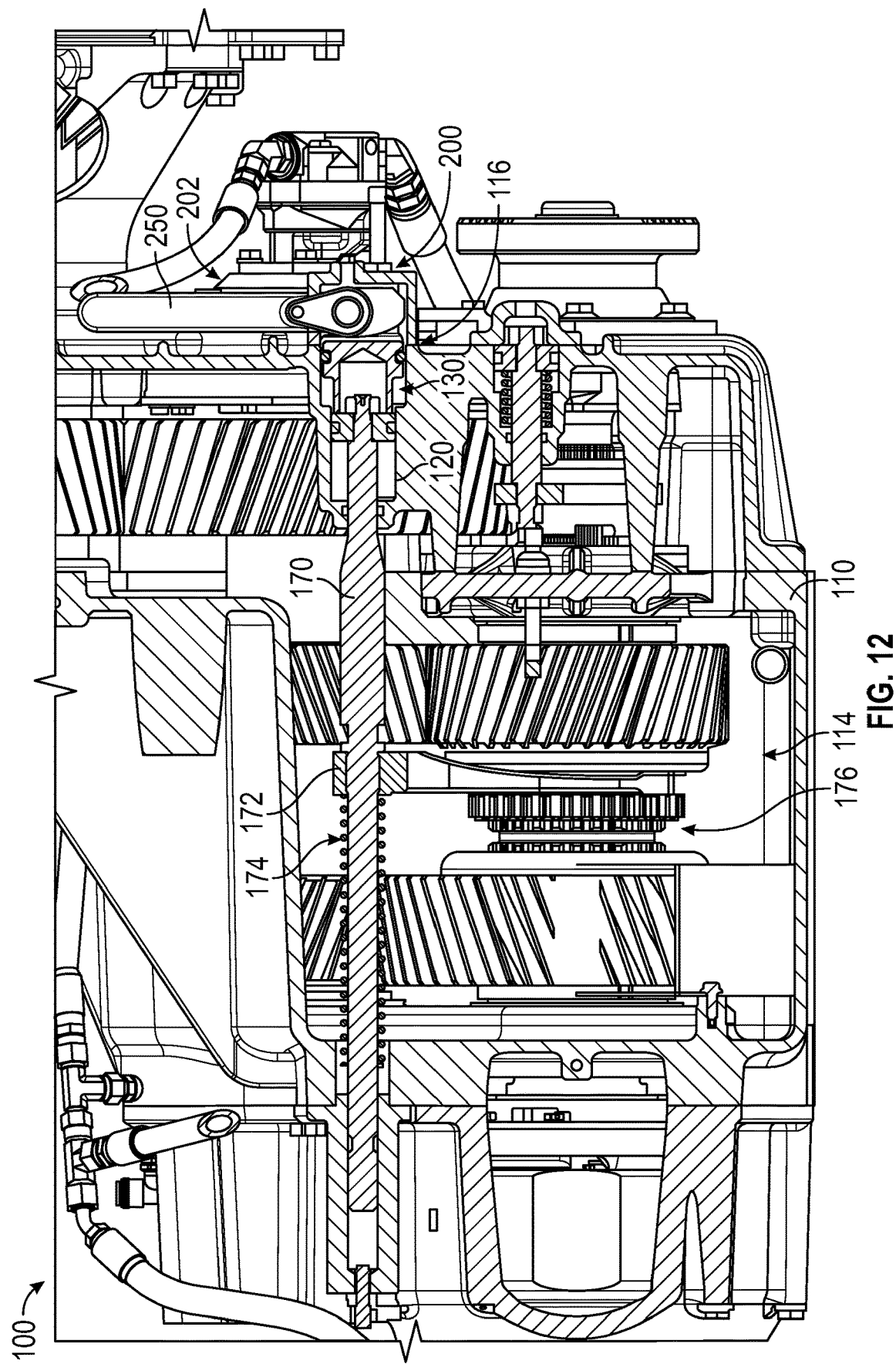
FIGS. 12 and 13 are various views of the first neutral override system coupled to the transfer case and selectively reconfigured into the first configuration, according to an exemplary embodiment.
Figure 13:
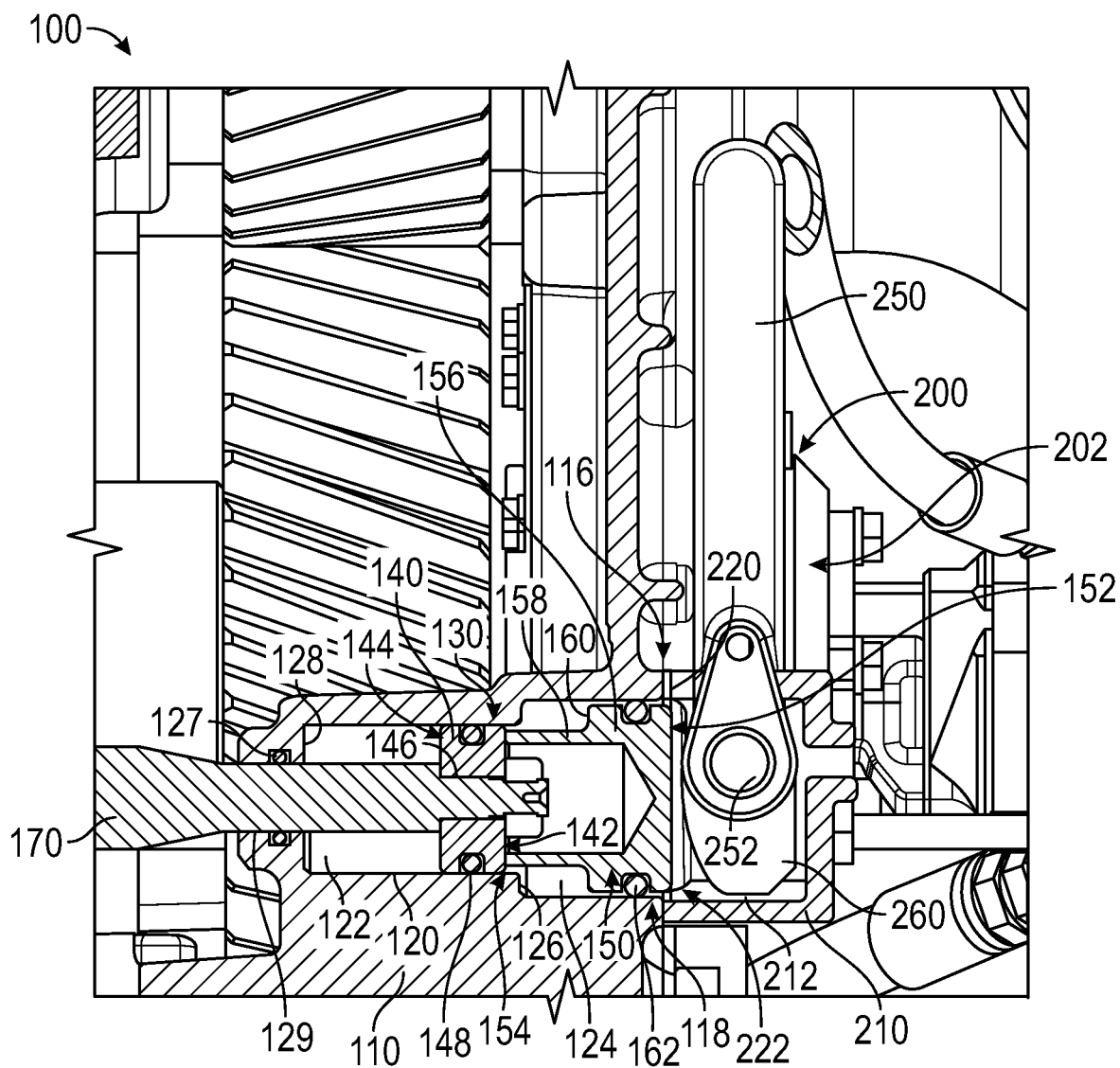
Figure 14:
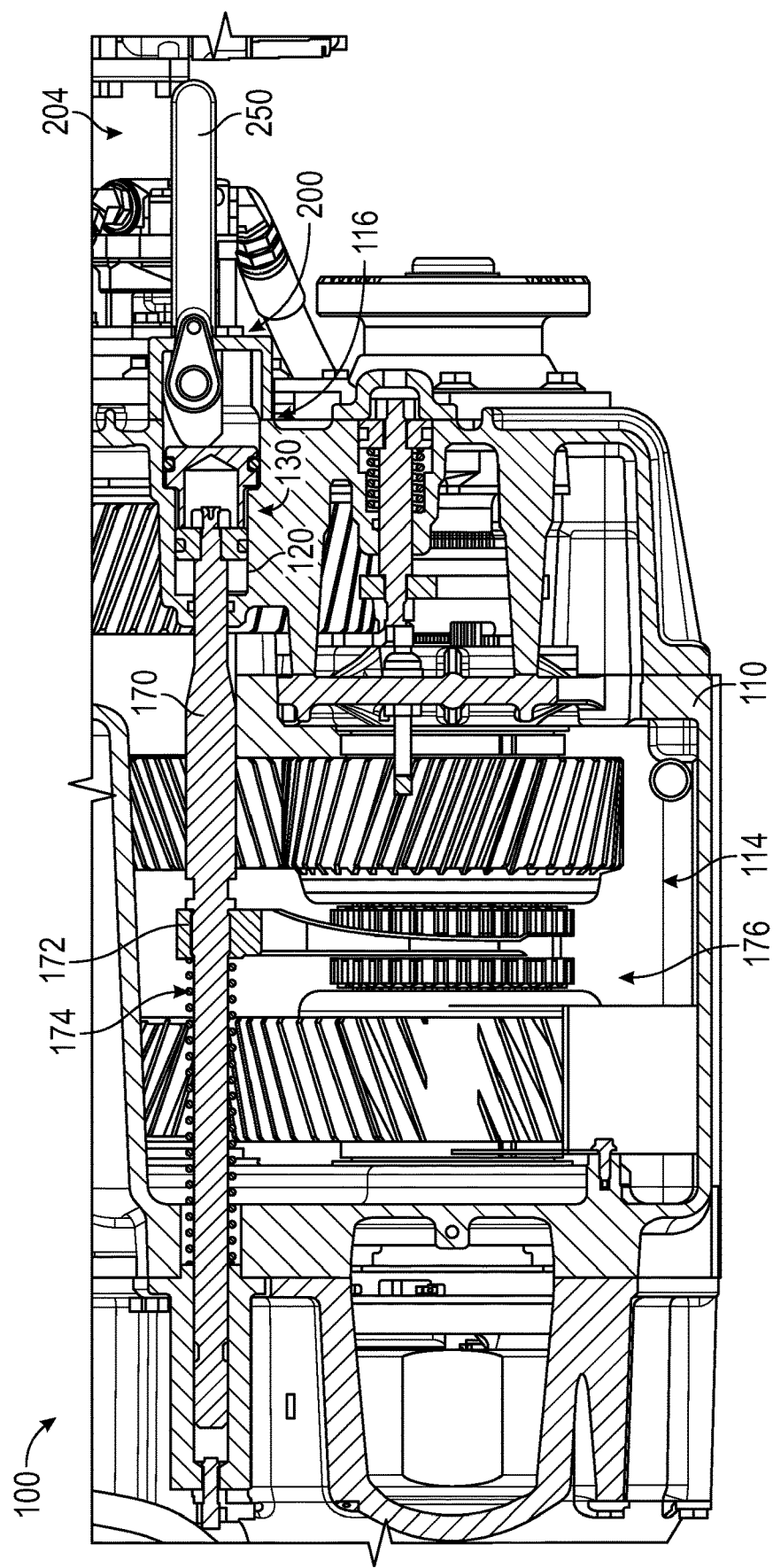
FIGS. 14 and 15 are various views of the first neutral override system coupled to the transfer case and selectively reconfigured into the second configuration, according to an exemplary embodiment.

As shown in FIGS. 12-15, 22, and 23, the transfer case housing 110 defines a first interior cavity, shown as gearing cavity 114, a second mounting location, shown as override system mount 116, and a second interior cavity, shown as piston cavity 120. As shown in FIGS. 12 and 14, the gearing cavity 114 houses at least a portion of a rod, shown as shift rod 170, a fork, shown as shift fork 172, a resilient member, shown as biasing spring 174, and a plurality of gears, shown as gearing 176. The shift fork 172 is coupled to the shift rod 170. The shift fork 172 may thereby translate with the shift rod 170. The biasing spring 174 is positioned to bias or force the shift rod 170 and the shift fork 172 into a nominal position (e.g., a high position, etc.). The shift fork 172 is coupled to the gearing 176. According to an exemplary embodiment, the shift rod 170 is selectively translatable such that movement of the shift rod 170 causes the shift fork 172, and thereby the gearing 176, to move therewith. Such movement of the shift rod 170 may facilitate reconfiguring the transfer case 100 between a high mode, a low mode, and/or a neutral mode of operation.

As shown in FIGS. 13, 15, 22, and 23, the piston cavity 120 has a first portion, shown as shift chamber 122, and a second chamber, shown as neutral chamber 124, connected to the shift chamber 122. According to the exemplary embodiment shown in FIGS. 13, 15, 22, and 23, the neutral chamber 124 has a larger diameter than the shift chamber 122 such that a ledge, shown as retaining lip 126, is defined therebetween. In other embodiments, the shift chamber 122 has a larger diameter than the neutral chamber 124. In still other embodiment, the shift chamber 122 and the neutral chamber 124 have the same diameter. As shown in FIGS. 13, 15, 22, and 23, the shift chamber 122 of the piston cavity 120 has a wall, shown as end wall 128, that defines an aperture, shown as rod aperture 129. As shown in FIGS. 13, 15, 22, and 23, the override system mount 116 defines an aperture, shown as cavity opening 118, within the transfer case housing 110 that is positioned to align with the neutral chamber 124 of the piston cavity 120 (e.g., such that an end of the neutral chamber 124 opposite the shift chamber 122 is open to the exterior of the transfer case housing 110, etc.).

As shown in FIGS. 12-15, 22, and 23, the piston cavity 120 is configured to slidably receive a dual piston system, shown as piston assembly 130. As shown in FIGS. 13, 15, 22, and 23, the piston assembly 130 includes a first piston, shown as shift piston 140, disposed within the shift chamber 122 and a second piston, shown as neutral piston 150, disposed within the neutral chamber 124. According to an exemplary embodiment, the shift piston 140 is selectively translatable within the shift chamber 122 and at least a portion of the neutral piston 150 is selectively translatable within each of the shift chamber 122 and the neutral chamber 124. As shown in FIGS. 13, 15, 22, and 23, the shift piston 140 has a first face, shown as face 142, and an opposing second face, shown as face 144. The shift piston 140 further defines an aperture, shown as rod aperture 146. The shift piston 140 includes a sealing member (e.g., a gasket, an O-ring, etc.), shown as seal 148, positioned to effectively seal the engagement between the shift piston 140 and a sidewall of the shift chamber 122 such that the shift chamber 122 is isolated from the neutral chamber 124.

As shown in FIGS. 13, 15, 22, and 23, the neutral piston 150 includes a first portion, shown as piston head 156, and a second portion, shown as piston plunger 158. According to the exemplary embodiment shown in FIGS. 13, 15, 22, and 23, the piston head 156 has a larger diameter than the piston plunger 158 such that a lip, shown as engagement lip 160, is defined therebetween. According to an exemplary embodiment, the engagement lip 160 of the neutral piston 150 is positioned to engage with the retaining lip 126 of the piston cavity 120 such that the translational movement of the neutral piston 150 is limited. As shown in FIGS. 13, 15, 22, and 23, the piston head 156 has a first face, shown as face 152, and the piston plunger 158 has an opposing second face, shown as face 154. According to an exemplary embodiment, the face 154 of the piston plunger 158 of the neutral piston 150 is positioned to selectively engage with the face 142 of the shift piston 140. According to an exemplary embodiment, the face 152 of the piston head 156 of the neutral piston 150 is positioned to enclose the cavity opening 118 of the override system mount 116 and selectively engage with the cam override system 200 and/or the helical override system 300. As shown in FIGS. 13, 15, 22, and 23, the piston head 156 of the neutral piston 150 includes a sealing member (e.g., a gasket, an O-ring, etc.), shown as seal 162, positioned to effectively seal the engagement between the piston head 156 and a sidewall of the neutral chamber 124 such that the neutral chamber 124 is isolated from the exterior of the transfer case housing 110 (e.g., an inner cavity of the cam override system 200, the helical override system 300, etc.).

As shown in FIGS. 12-15, 22, and 23, an end of the shift rod 170 extends into the piston cavity 120. As shown in FIGS. 13, 15, 22, and 23, the end of the shift rod 170 extends through the rod aperture 129 of the end wall 128 of the shift chamber 122 of the piston cavity 120 and engages with the rod aperture 146 of the shift piston 140, coupling the shift piston 140 thereto (e.g., with fasteners, an interference fit, a press fit, a treaded engagement, etc.). As shown in FIGS. 13, 15, 22, and 23, the rod aperture 129 includes a sealing member (e.g., a gasket, an O-ring, etc.), shown as seal 127, positioned to effectively seal the engagement between the shift rod 170 and the rod aperture 129 such that the piston cavity 120 is isolated from the gearing cavity 114.

As shown in FIGS. 12-15, the cam override system 200 is coupled to the override system mount 116 of the transfer case housing 110. As shown in FIGS. 6-11, 13, and 15, the cam override system 200 includes a housing, shown as cam housing 210, defining an interior cavity, shown as cam cavity 212. As shown in FIGS. 6-11, the cam override system 200 includes a flange, shown as flange 220, positioned at a front end of the cam housing 210. As shown in FIGS. 6, 8, 9, and 11, the flange 220 defines an aperture, shown as aperture 222. As shown in FIGS. 13 and 14, the flange 220 is configured to interface with the override system mount 116 such that the aperture 222 aligns with the cavity opening 118 such that the cam cavity 212 extends the piston cavity 120. As shown in FIGS. 6-11, the cam override system 200 includes a plurality of fasteners, shown as fasteners 230. According to an exemplary embodiment, the fasteners 230 are configured to selectively couple the cam housing 210 to the override system mount 116.

Figure 7:
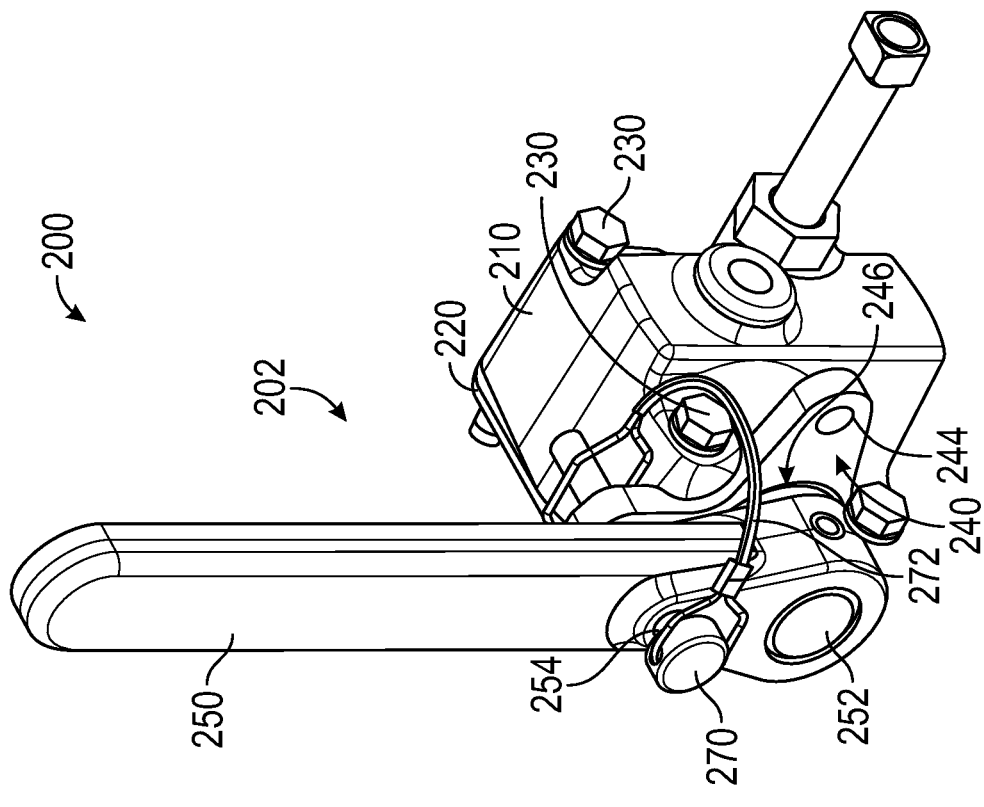
FIGS. 6-8 are various views of a first neutral override system for the transfer case of FIGS. 2-5 arranged in a first configuration, according to an exemplary embodiment.
Figure 8:
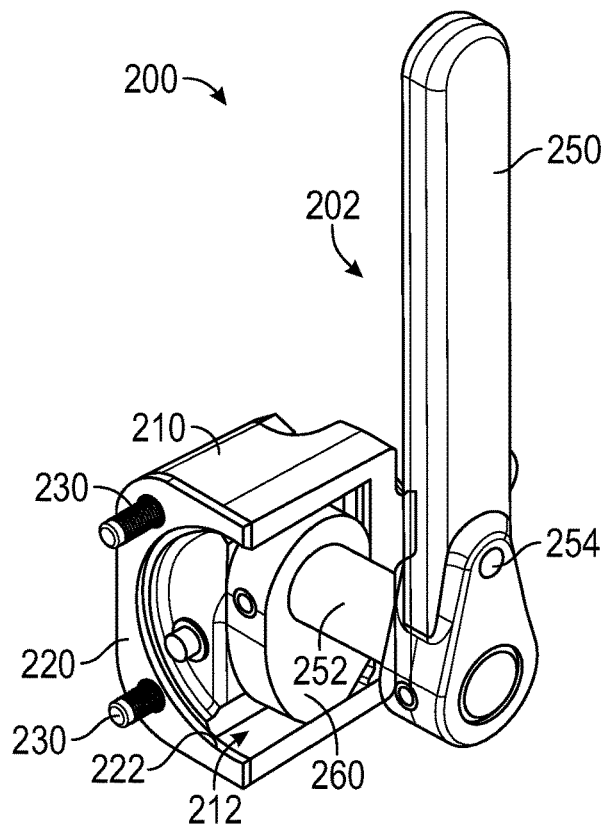
Figure 9:
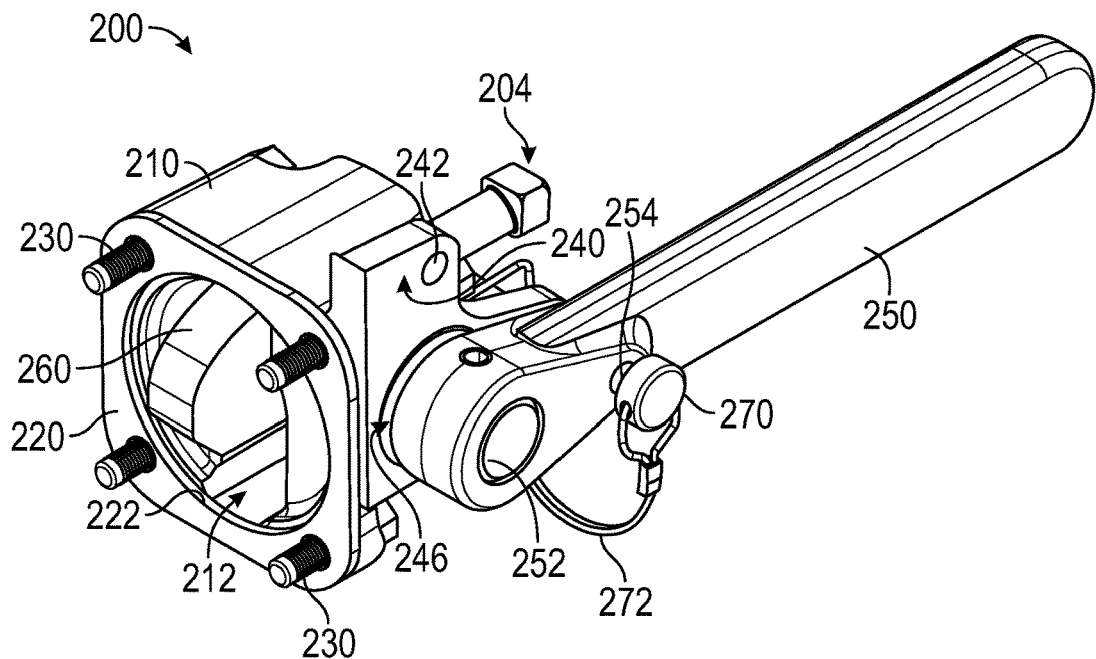
FIGS. 9-11 are various views of the first neutral override system of FIGS. 6-8 arranged in a second configuration, according to an exemplary embodiment.
Figure 10:
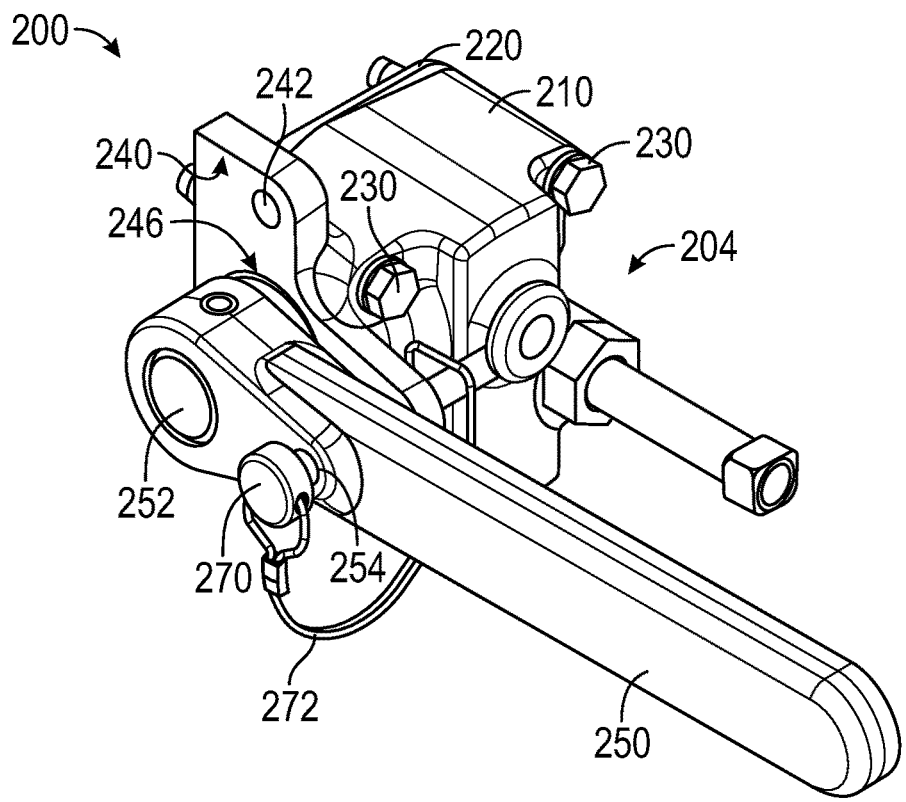
Figure 11:
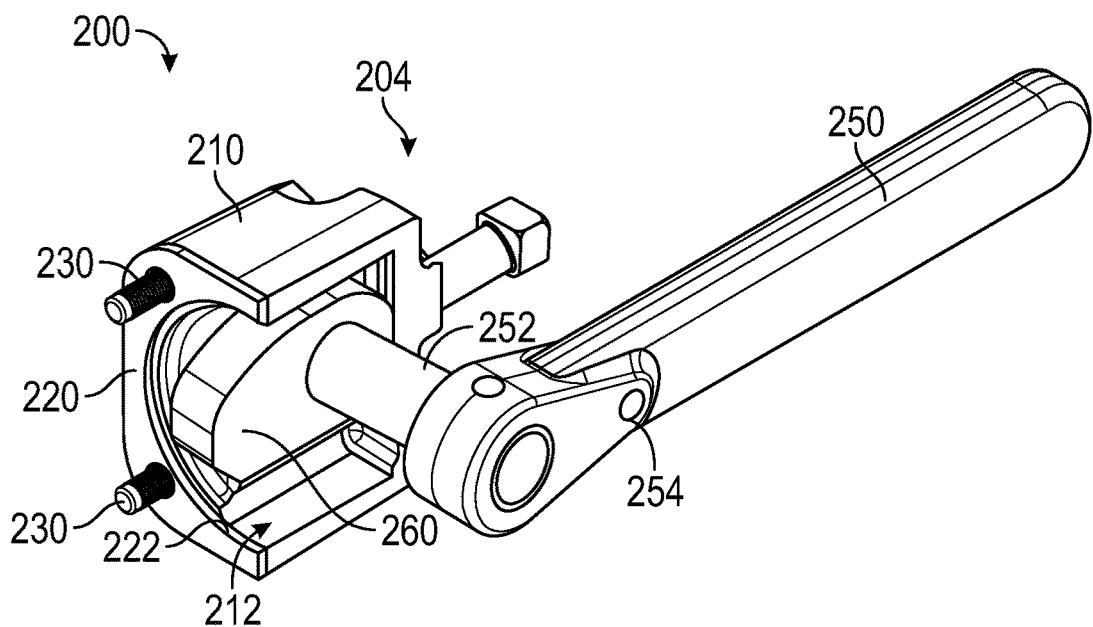

As shown in FIGS. 6, 7, 9, and 10, the cam housing 210 includes a plate, shown as locking plate 240, extending from a sidewall thereof. As shown in FIGS. 9 and 10, the locking plate 240 defines a first aperture, shown as retaining aperture 242. As shown in FIG. 7, the locking plate 240 defines a second aperture, shown as retaining aperture 244. As shown in FIGS. 6, 7, 9, and 10, the locking plate 240 defines a third aperture, shown as lever aperture 246. As shown in FIGS. 6-15, the cam override system 200 includes an actuator, shown as lever 250. As shown in FIGS. 6-11, 13, and 15, the lever 250 includes an extension, shown as pivot rod 252, extending from a lower end thereof. According to an exemplary embodiment, the pivot rod 252 extends through the lever aperture 246 of the locking plate 240 into the cam cavity 212. As shown in FIGS. 6, 8, 9, 11, 13, and 15, the cam override system 200 includes a rotary engagement element, shown as cam 260, disposed within the cam cavity 212. As shown in FIGS. 8 and 11, an end of the pivot rod 252 of the lever 250 is coupled to the cam 260 such that pivotal movement of the lever 250 causes the cam 260 to rotate within the cam cavity 212.

Figure 6:
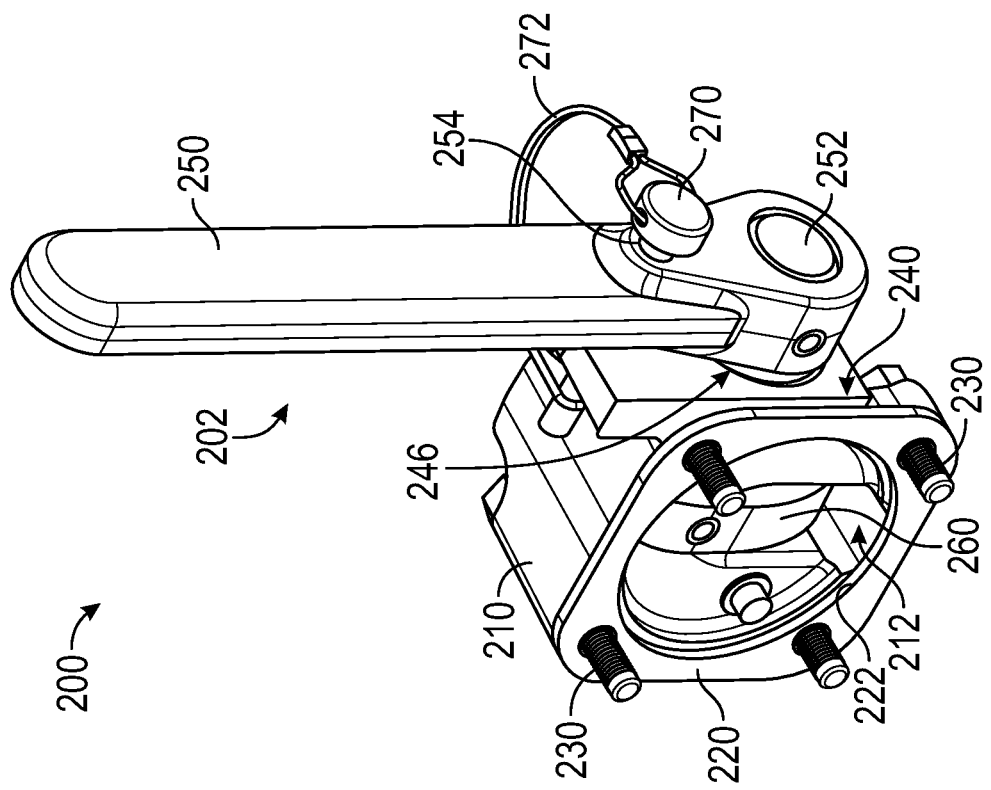
Figure 15:
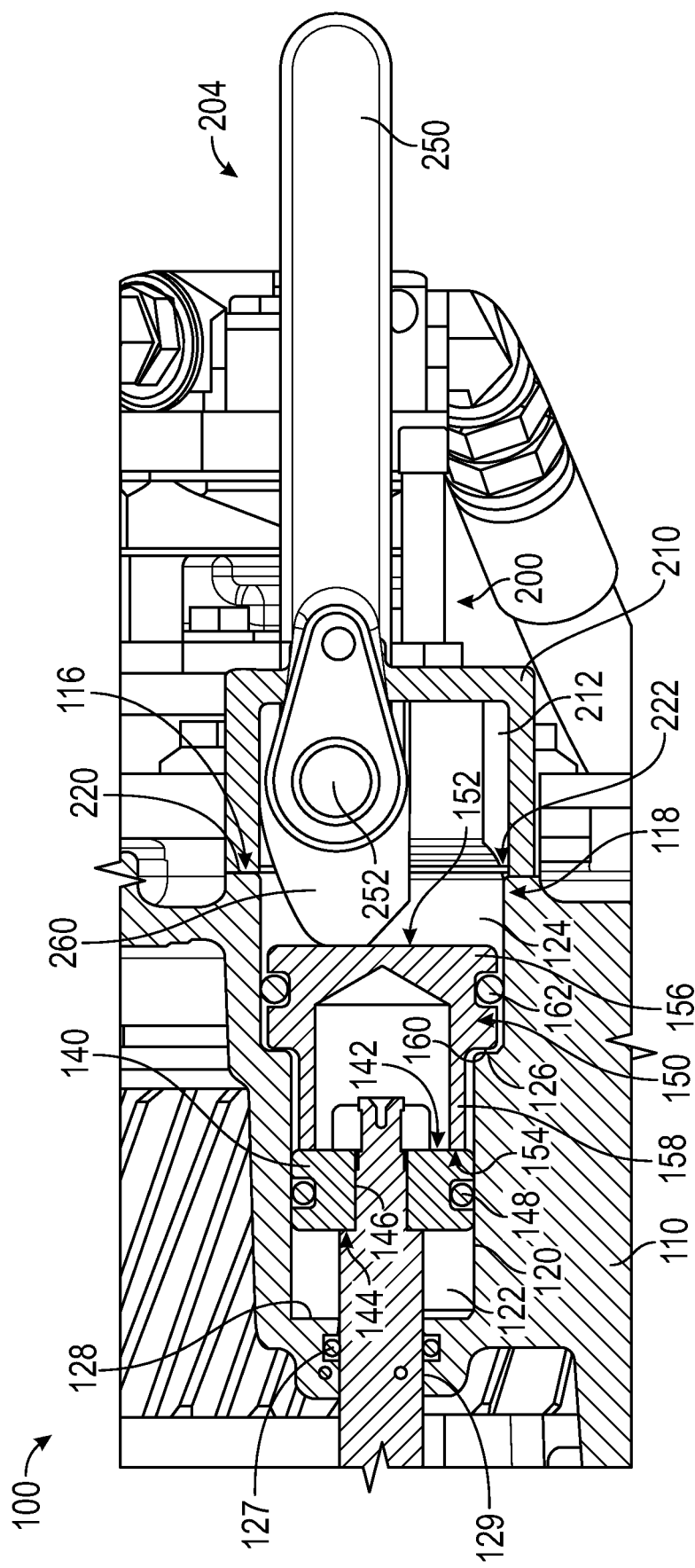
Figure 19:
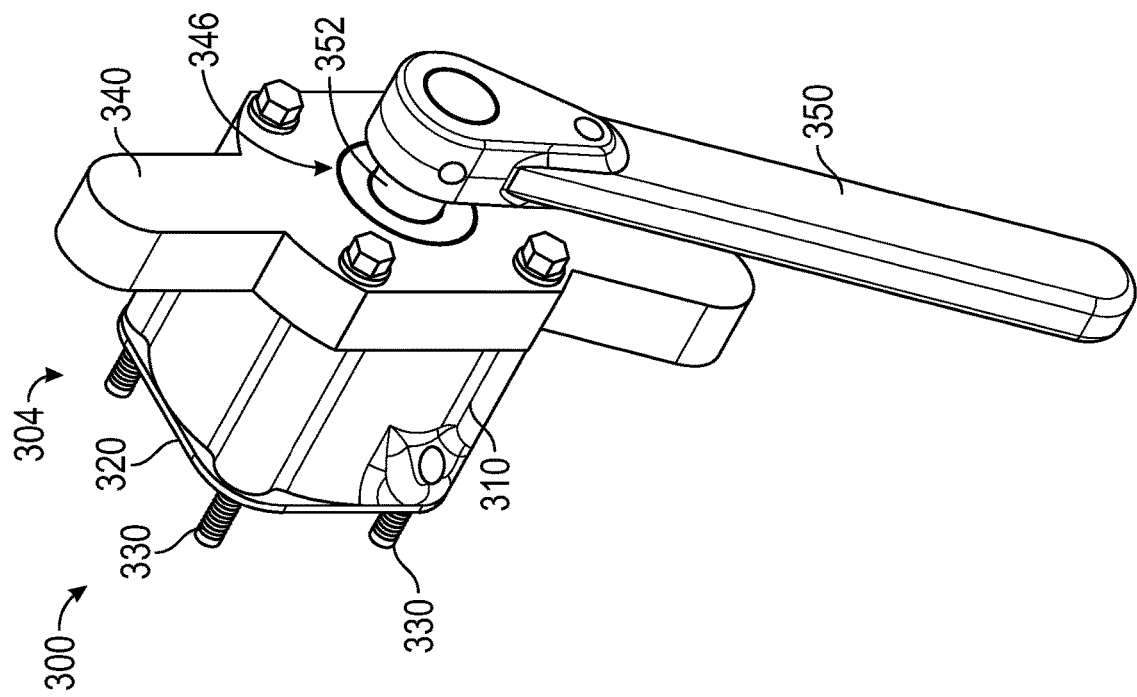
FIGS. 19-21 are various views of the second neutral override system of FIGS. 16-18 arranged in a second configuration, according to an exemplary embodiment.

As shown in FIGS. 6-8, 12, and 13, the lever 250 is oriented in a first position, shown as disengaged position 202. As shown in FIGS. 9-11, 14, and 15, the lever 250 is oriented in a second position, shown as engaged position 204. According to an exemplary embodiment, the lever 250 may be selectively pivoted between the disengaged position 202 and the engaged position 204. As shown in FIGS. 6, 8, and 13, the cam 260 is entirely disposed within the cam cavity 212 when the lever 250 is arranged in the disengaged position 202. As shown in FIGS. 9, 11, and 15, a portion of the cam 260 pivots from the cam cavity 212 through the aperture 222 of the flange 220 and the cavity opening 118 of the override system mount 116 into the piston cavity 120 when the lever 250 is arranged in the engaged position 204. The cam 260 may thereby engage with the face 152 of the piston head 156 of the neutral piston 150 when the lever 250 is arranged in the engaged position 204.

As shown in FIGS. 6-11, the lever 250 defines an aperture, shown as locking aperture 254 positioned to align with (i) the retaining aperture 242 when the lever 250 is oriented in the disengaged position 202 and (ii) the retaining aperture 244 when the lever 250 is oriented in the engaged position 204. As shown in FIGS. 6, 7, 9, and 10, the cam override system 200 includes a pin, shown as locking pin 270. According to an exemplary embodiment, the locking pin 270 is configured to be received by the locking aperture 254 of the lever 250 and the retaining aperture 242 of the locking plate 240 to selectively lock or hold the lever 250 in the disengaged position 202. According to an exemplary embodiment, the locking pin 270 is configured to be received by the locking aperture 254 of the lever 250 and the retaining aperture 244 of the locking plate 240 to selectively lock or hold the lever 250 in the engaged position 204. As shown in FIGS. 6, 7, 9, and 10, the locking pin 270 includes a leash, shown as lanyard 272. According to an exemplary embodiment, the lanyard 272 is configured to couple the locking pin 270 to the cam housing 210 such that the locking pin 270 is not misplaced when removed from the locking aperture 254 of the lever 250.

Figure 21:
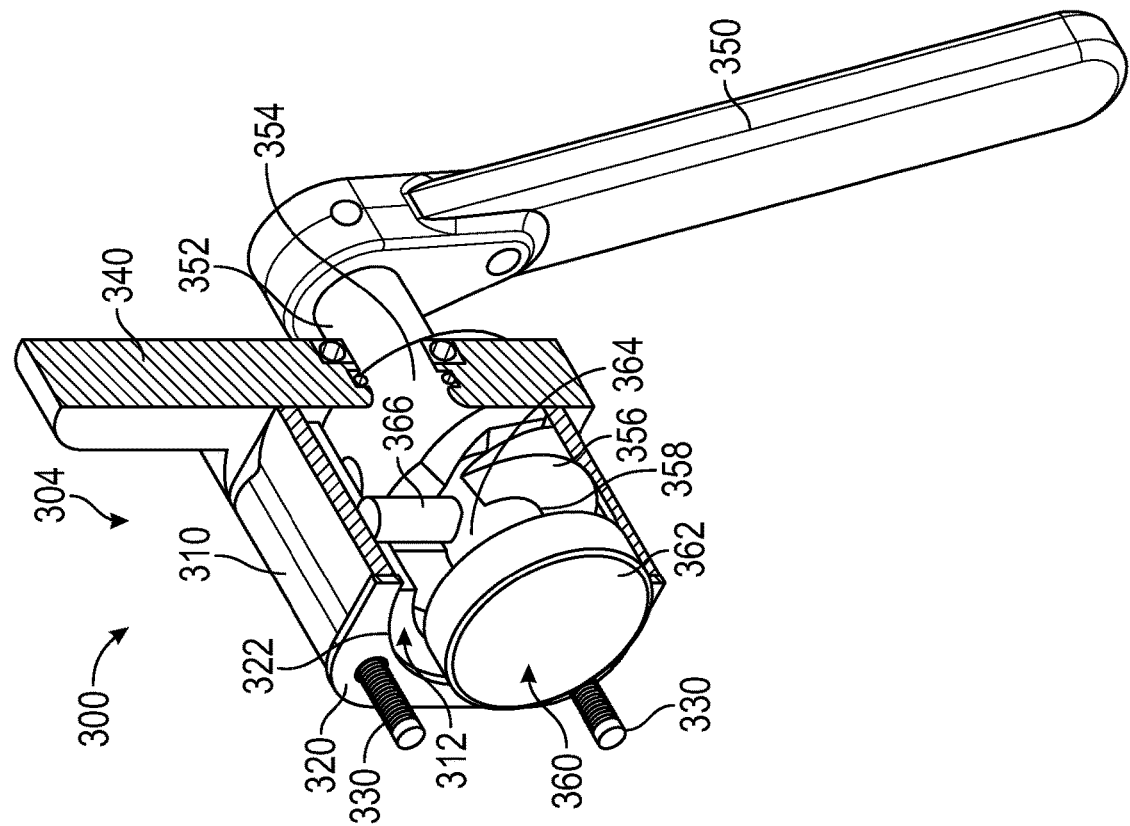
Figure 22:
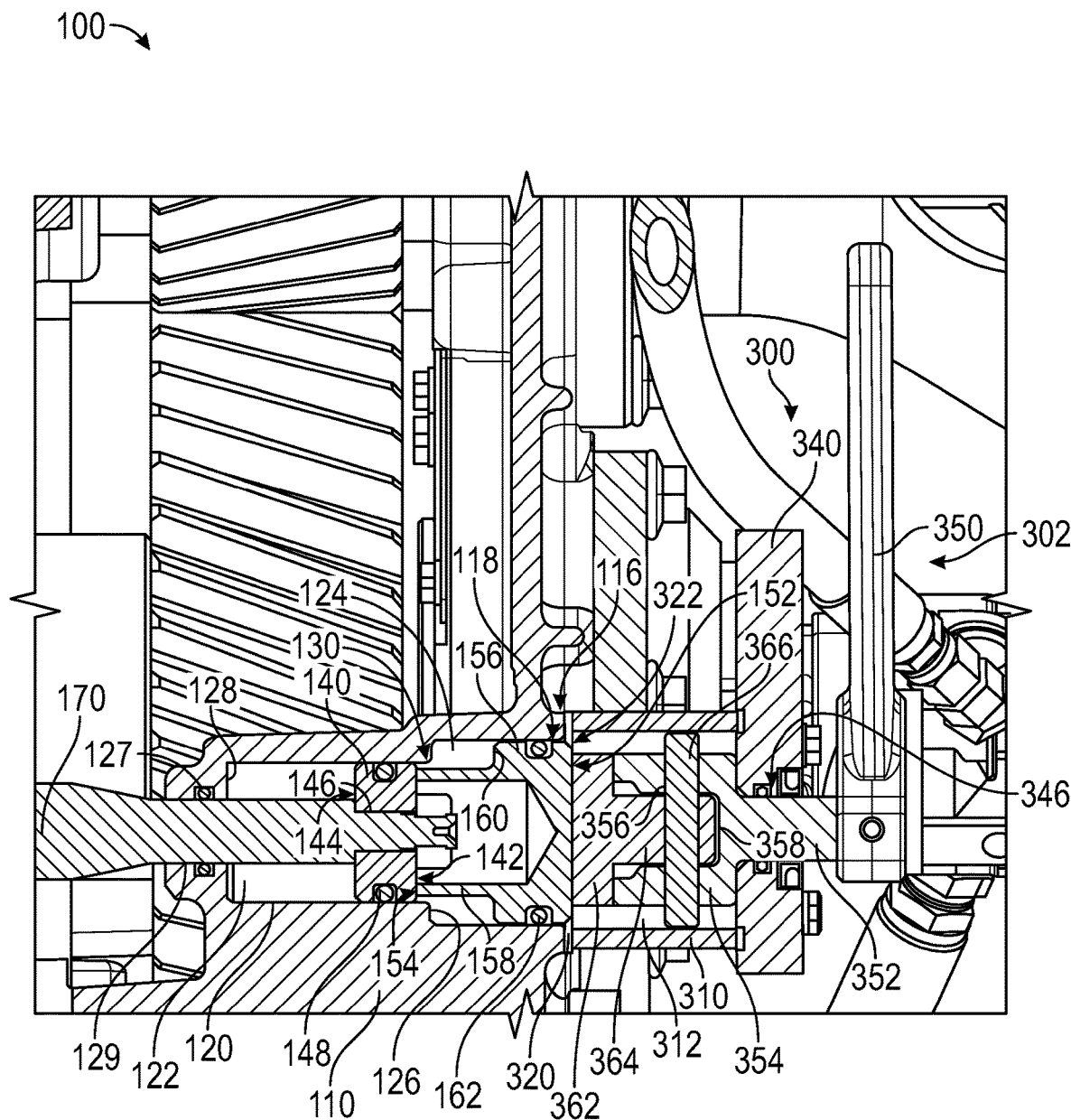
FIG. 22 is a detailed cross-sectional view of the second neutral override system coupled to the transfer case and selectively reconfigured into the first configuration, according to an exemplary embodiment.
Figure 23:
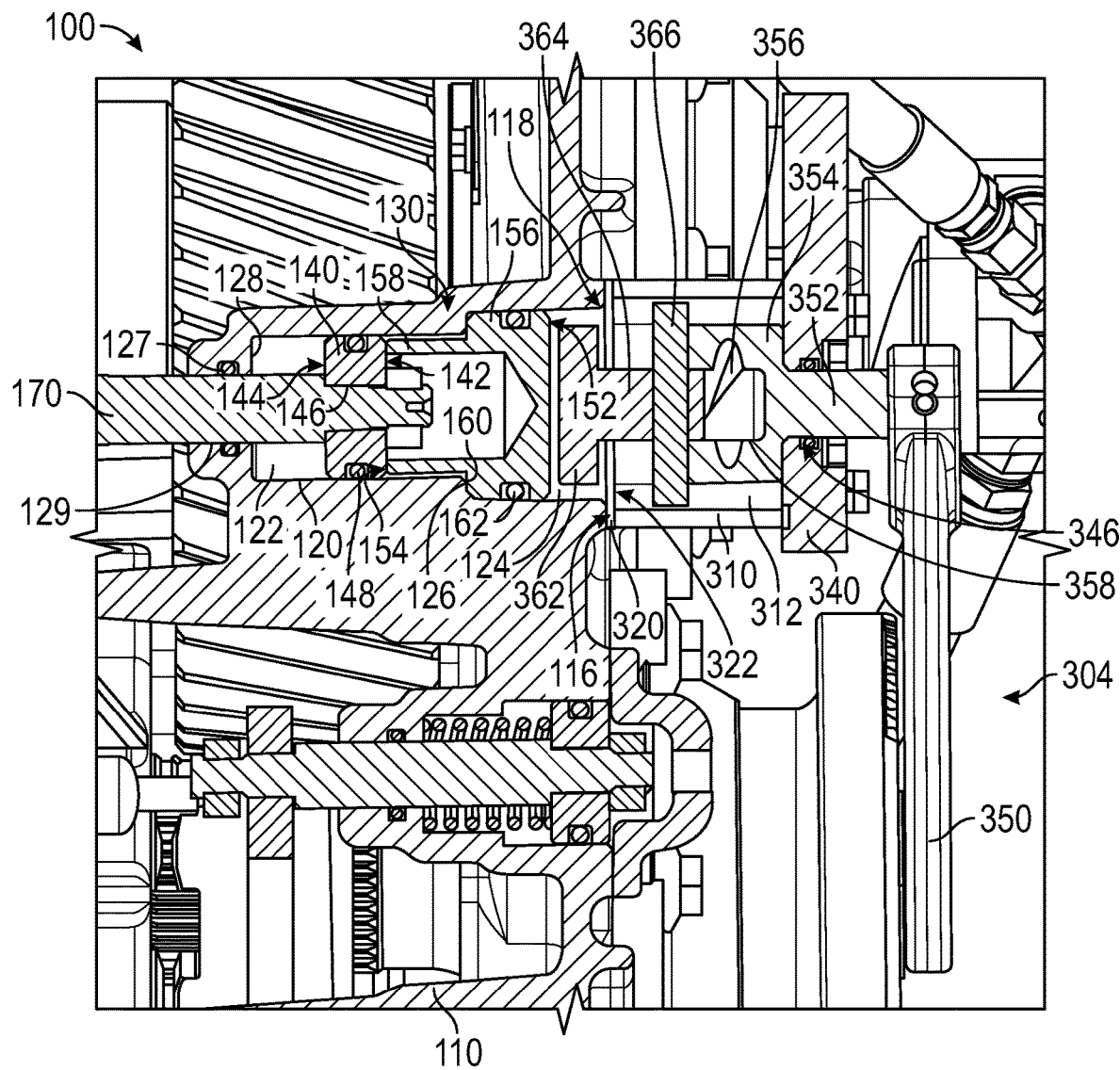
FIG. 23 is a detailed cross-sectional view of the second neutral override system coupled to the transfer case and selectively reconfigured into the second configuration, according to an exemplary embodiment.

As shown in FIGS. 22 and 23, the helical override system 300 is coupled to the override system mount 116 of the transfer case housing 110. As shown in FIGS. 16-23, the helical override system 300 includes a housing, shown as plunger housing 310, defining an interior cavity, shown as plunger cavity 312. The helical override system 300 includes a flange, shown as flange 320, positioned at a front end of the plunger housing 310. As shown in FIGS. 17,18, and 20-23, the flange 320 defines an aperture, shown as aperture 322. As shown in FIGS. 22 and 23, the flange 320 is configured to interface with the override system mount 116 such that the aperture 322 aligns with the cavity opening 118 such that the plunger cavity 312 extends the piston cavity 120. As shown in FIGS. 16-21, the helical override system 300 includes a plurality of fasteners, shown as fasteners 330. According to an exemplary embodiment, the fasteners 330 are configured to selectively couple the plunger housing 310 to the override system mount 116.

As shown in FIGS. 16-23, the plunger housing 310 includes a plate, shown as plate 340, extending from a rear end thereof. As shown in FIGS. 16,19,22, and 23, the plate 340 defines an aperture, shown as lever aperture 346. As shown in FIGS. 16-23, the helical override system 300 includes an actuator, shown as lever 350. As shown in FIGS. 16,18,19, and 21-23, the lever 350 includes an extension, shown as pivot rod 352, extending from a lower end thereof. As shown in FIGS. 22 and 23, the pivot rod 352 extends through the lever aperture 346 of the plate 340 into the plunger cavity 312. As shown in FIGS. 18 and 21-23, the pivot rod 352 includes a body, shown as plunger cup 354, coupled to an end thereof. The plunger cup 354 has a sidewall that defines an interior slot or bore, shown as plunger slot 358, and a cutout or pathway, shown as helical path 356, extending through the sidewall of the plunger cup 354 into the plunger slot 358 and along the length of the plunger cup 354 in a helical pattern.

As shown in FIGS. 17,18, and 20-23, the helical override system 300 includes an translational engagement element, shown as plunger 360, including a head, shown as plunger head 362, a rod, shown as plunger rod 364, extending from the plunger head 362, and a pin, shown as plunger pin 366, extending from the plunger rod 364. As shown in FIGS. 21-23, the plunger rod 364 is slidably received within the plunger slot 358 of the plunger cup 354. As shown in FIGS. 18 and 21-23, the plunger pin 366 is received within the helical path 356. According to an exemplary embodiment, pivotal movement of the lever 350 causes the plunger cup 354 to rotate within the plunger cavity 312 such that engagement between plunger pin 366 and the helical path 356 causes the plunger rod 364 to translate within the plunger slot 358, thereby facilitating the extension and the retraction of the plunger head 362 from or into the plunger cavity 312 through the aperture 322, respectively.

Figure 18:
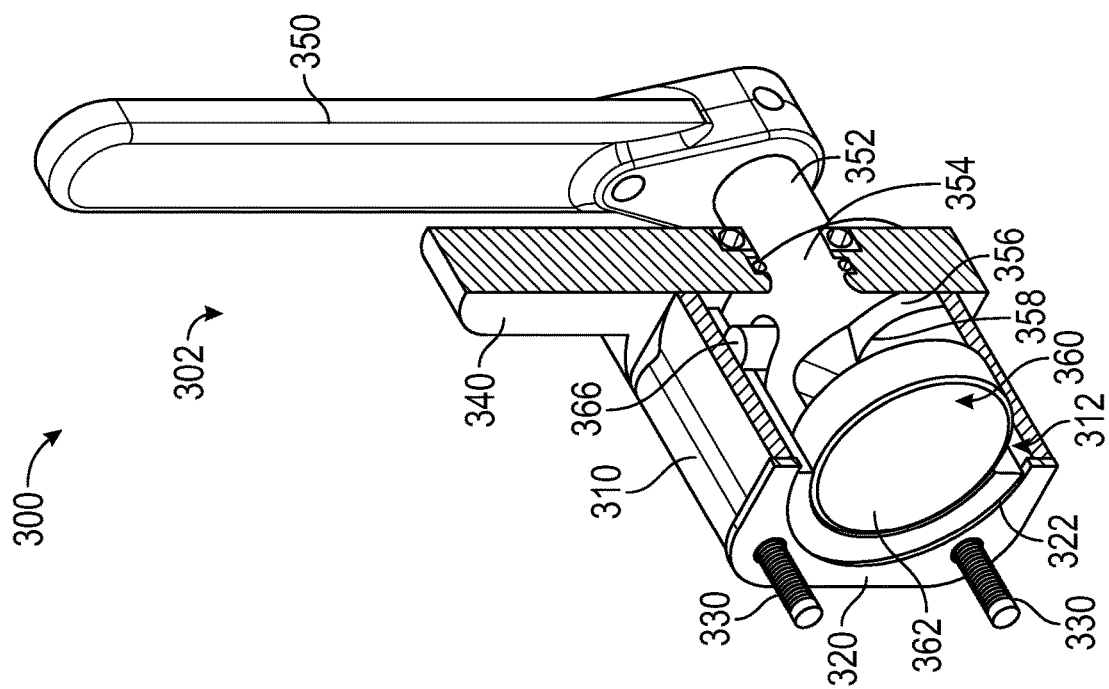
Figure 20:
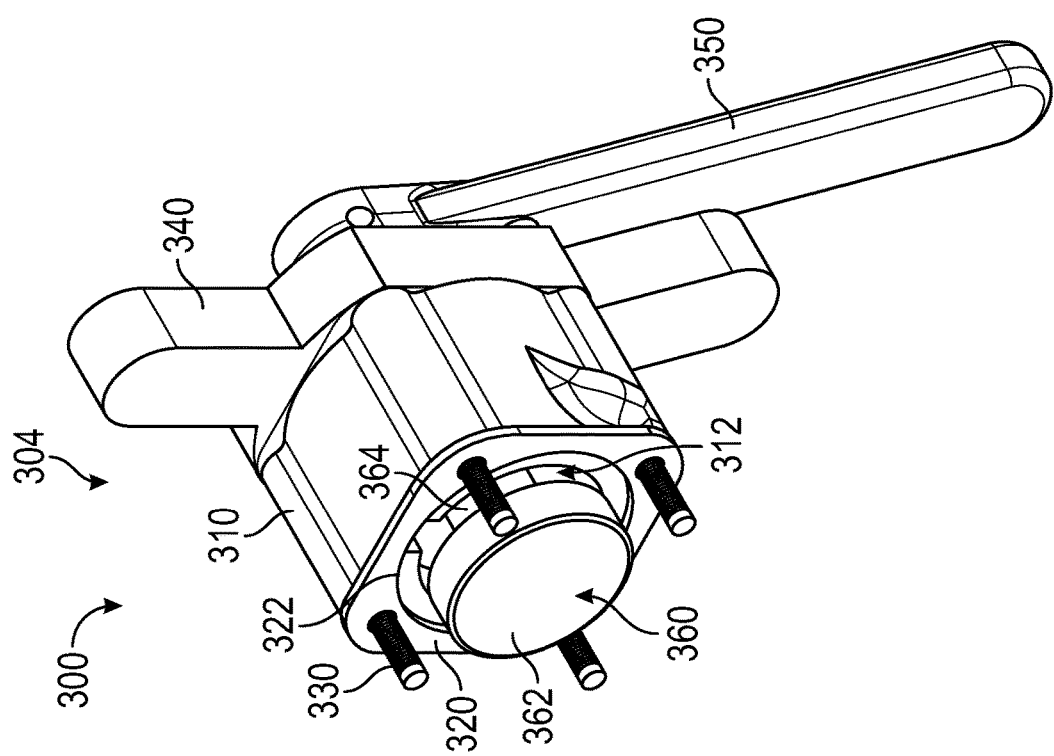

As shown in FIGS. 16-18 and 22, the lever 350 is oriented in a first position, shown as disengaged position 302. As shown in FIGS. 19-21 and 23, the lever 350 is oriented in a second position, shown as engaged position 304. According to an exemplary embodiment, the lever 350 may be selectively pivoted between the disengaged position 302 and the engaged position 304. As shown in FIGS. 17,18, and 22, the plunger 360 is entirely disposed within the plunger cavity 312 when the lever 350 is arranged in the disengaged position 302. As shown in FIGS. 20,21, and 23, the plunger head 362 of the plunger 360 extends from the plunger cavity 312 through the aperture 322 of the flange 320 and the cavity opening 118 of the override system mount 116 into the piston cavity 120 when the lever 350 is arranged in the engaged position 304. The plunger head 362 may thereby engage with the face 152 of the piston head 156 of the neutral piston 150 when the lever 350 is arranged in the engaged position 304.

According to an exemplary embodiment, the shift piston 140 is selectively translatable within the shift chamber 122 between (i) a first position or high position, (ii) a second position, intermediate position, or neutral position, and (iii) an third position or low position. According to an exemplary embodiment, the biasing spring 174 is positioned to bias the shift rod 170, and thereby the shift piston 140 into the high position. According to an exemplary embodiment, the transfer case 100 includes a fluid system (e.g., a pneumatic system, a hydraulic system, etc.) configured to selectively provide and/or remove fluid (e.g., air, hydraulic fluid, etc.) into and/or from at least one of the shift chamber 122, the neutral chamber 124, the cam cavity 212, and/or the plunger cavity 312 (e.g., through an inlet and/or outlet port thereof, etc.) to selectively reposition (e.g., automatically based on operation of the vehicle 10, in response to an operator command provided from within the front cabin 20, etc.) the shift piston 140 between the high position, the neutral position, and the low position.

By way of example, the fluid system may provide fluid into the shift chamber 122 (e.g., between the end wall 128 and the face 144 of the shift piston 140, etc.), remove fluid from the neutral chamber 124 (e.g., between the face 142 of the shift piston 140 and the engagement lip 160 of the neutral piston 150, etc.), and/or remove fluid from the cam cavity 212 and/or the plunger cavity 312 (e.g., between the face 152 of the neutral piston 150 and the cam cavity 212 and/or the plunger cavity 312, etc.) such that the shift piston 140 is forced into the high position (e.g., as shown in FIGS. 12, 13, and 22), pulling the shift rod 170 and the shift fork 172 which may thereby reconfigure the gearing 176 such that the transfer case 100 operates in the high mode. By way of another example, the fluid system may remove fluid from the shift chamber 122, provide fluid to the neutral chamber 124, and/or provide fluid to the cam cavity 212 and/or the plunger cavity 312 (e.g., such that the neutral piston 150 engages with the shift piston 140, etc.) such that the shift piston 140 overcomes the biasing force of the biasing spring 174 and is forced into the neutral position (e.g., as shown in FIGS. 14, 15, and 23), pushing the shift rod 170 and the shift fork 172 which may thereby reconfigure the gearing 176 such that the transfer case 100 operates in the neutral mode. By way of still another example, the fluid system may remove additional fluid from the shift chamber 122 and/or provide additional fluid to the neutral chamber 124 such that the shift piston 140 further overcomes the biasing force of the biasing spring 174 and is forced into the low position (e.g., such that the face 144 of the shift piston 140 is proximate the end wall 128 of the piston cavity 120, etc.), pushing the shift rod 170 and the shift fork 172 further which may thereby reconfigure the gearing 176 such that the transfer case 100 operates in the low mode.

According to an exemplary embodiment, the cam override system 200 and/or the helical override system 300 are configured to facilitate manually overriding the fluid system (e.g., if the fluid system were to fail, become damaged, lose pressure, etc.). More specifically, the cam override system 200 and/or the helical override system 300 may be used to manually reconfigure the transfer case 100 into the neutral mode from the high mode. By way of example, during a failure of fluid system, the biasing spring 174 may provide the biasing force to the shift rod 170 and shift fork 172 such that the transfer case 100 is reconfigured into or maintained in the high mode and the shift piston 140 is moved into or maintained in the high position. The cam override system 200 and/or the helical override system 300 may thereby facilitate manually reconfiguring the transfer case 100 from the high mode to the neutral mode during situations of fluid system failure to facilitate towing the vehicle 10 (e.g., without having to drop a drive shaft of the vehicle 10, without damaging the transmission 60, etc.).

As shown in FIG. 15, the lever 250 is pivoted into in the engaged position 204 such that a portion of the cam 260 pivots from the cam housing 210 into the neutral chamber 124, engaging the face 152 of the piston head 156. Such engagement between the cam 260 and the piston head 156 pushes the neutral piston 150 within the neutral chamber 124 such that the face 154 of the piston plunger 158 extends into the shift chamber 122 a predetermined depth (e.g., until the engagement lip 160 engages with the retaining lip 126, etc.) and engages with the face 142 of the shift piston 140. Such engagement between the piston plunger 158 and the shift piston 140 pushes the shift piston 140 within the shift chamber 122 from the high position to the neutral position, thereby reconfiguring the transfer case 100 from the high mode to the neutral mode.

As shown in FIG. 23, the lever 350 is pivoted into in the engaged position 304 such that the plunger head 262 translates from the plunger housing 310 into the neutral chamber 124, engaging the face 152 of the piston head 156. Such engagement between plunger head 262 and the piston head 156 pushes the neutral piston 150 within the neutral chamber 124 such that the face 154 of the piston plunger 158 extends into the shift chamber 122 a predetermined depth (e.g., until the engagement lip 160 engages with the retaining lip 126, etc.) and engages with the face 142 of the shift piston 140. Such engagement between the piston plunger 158 and the shift piston 140 pushes the shift piston 140 within the shift chamber 122 from the high position to the neutral position, thereby reconfiguring the transfer case 100 from the high mode to the neutral mode.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A vehicle, including:
   a transmission;
   a transfer case coupled to the transmission, the transfer case including:
      a shift rod;
      a piston assembly including a first piston coupled to the shift rod and a second piston selectively engageable with the first piston; and
      a resilient member positioned to bias the shift rod and the first piston into a high position corresponding with a high mode of operation of the transfer case; and
   an override system including:
      a housing coupled to the transfer case;
      a lever coupled to the housing, the lever pivotally actuatable between a first position and a second position; and
      an engagement element disposed within the housing and coupled to the lever, the engagement element configured to engage the second piston in response to the lever being pivoted from the first position to the second position such that the second piston engages the first piston, thereby repositioning the first piston and the shift rod to a neutral position corresponding with a neutral mode of operation of the transfer case.

2. The vehicle of claim 1, wherein the transfer case has a transfer case housing that defines (i) a gearing cavity that has gearing disposed therein, (ii) a piston cavity that has the piston assembly disposed therein, and (iii) a mount configured to receive the housing of the override system such that the engagement element aligns with the piston assembly within the piston cavity.

3. The vehicle of claim 2, wherein the piston cavity has a first chamber and a second chamber, the first piston selectively translatable within the first chamber and at least a portion of the second piston selectively translatable within the first chamber and the second chamber.

4. The vehicle of claim 2, wherein the transfer case includes a fork coupled to the shift rod and the gearing, the fork positioned to facilitate selectively reconfiguring the gearing into a first configuration corresponding to the high mode of operation and selectively reconfiguring the gearing into a second configuration corresponding to the neutral mode of operation.

5. The vehicle of claim 2, wherein a portion of shift rod extends from the gearing cavity through an aperture in the housing into the piston cavity.

6. The vehicle of claim 2, wherein the override system includes a pivot rod that extends from the lever through the housing to the engagement element.

7. The vehicle of claim 6, wherein the engagement element receives a rotational input from the pivot rod and provides at least one of (i) a rotational output and (ii) a translational output in response to the lever being pivoted to the second position.

8. The vehicle of claim 7, wherein the engagement element is a cam.

9. The vehicle of claim 8, wherein the cam is pivotable within the housing such that a portion of the cam selectively extends from the housing into the piston cavity and engages with the second piston in response to the lever being pivoted to the second position.

10. The vehicle of claim 7, wherein the engagement element is a plunger, and wherein an end of the pivot rod includes a plunger cup coupled thereto.

11. The vehicle of claim 10, wherein the plunger has a plunger head and a plunger rod extending from the plunger head, and wherein the plunger cup defines an internal bore that slidably receives the plunger rod.

12. The vehicle of claim 11, wherein a sidewall of the plunger cup defines a helical path that extends through the sidewall to the internal bore and along a length of the plunger cup, wherein the plunger includes a pin that extends from the plunger rod and is received within the helical path.

13. The vehicle of claim 12, wherein engagement of the pin with the helical path facilitates translation of the plunger rod along the internal bore such that the plunger head selectively extends from the housing into the piston cavity and engages with the second piston in response to the lever being pivoted to the second position.

14. The vehicle of claim 1, wherein the housing includes a plate that defines a first aperture and a second aperture, wherein the lever defines a third aperture, and wherein (i) the first aperture and the third aperture align and selectively receive a pin to lock the lever in the first position and (ii) the second aperture and the third aperture align and selectively receive the pin to lock the lever in the second position.

15. The vehicle of claim 1, wherein the transmission includes a transmission housing defining a first mount, wherein the transfer case includes a transfer case housing that defines a second mount, and wherein the vehicle further includes a power-take-off (PTO) assembly having:

a PTO coupled to the first mount and directly driven by the transmission;

a PTO-driven device coupled to the second mount; and a shaft extending between the PTO and the PTO-driven device such that the PTO-driven device is driven by the PTO.

* * * * *